(12) United States Patent
Takami

(10) Patent No.: US 10,277,570 B2
(45) Date of Patent: Apr. 30, 2019

(54) COMMUNICATION APPARATUS

(71) Applicant: CANON KABUSHIKI KAISHA, Tokyo (JP)

(72) Inventor: Shinjiro Takami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 161 days.

(21) Appl. No.: 15/004,397

(22) Filed: Jan. 22, 2016

(65) Prior Publication Data

US 2016/0226850 A1      Aug. 4, 2016

(30) Foreign Application Priority Data

Jan. 30, 2015   (JP) ................... 2015-017712

(51) Int. Cl.
| | | |
|---|---|---|
| *G06F 7/04* | (2006.01) | |
| *G06F 15/16* | (2006.01) | |
| *G06F 17/30* | (2006.01) | |
| *H04L 29/06* | (2006.01) | |
| *H04L 29/08* | (2006.01) | |

(52) U.S. Cl.
CPC ............ *H04L 63/08* (2013.01); *H04L 67/306* (2013.01); *H04L 67/34* (2013.01)

(58) Field of Classification Search
USPC ............................................................ 726/4
See application file for complete search history.

(56) References Cited

U.S. PATENT DOCUMENTS

| | | | | |
|---|---|---|---|---|
| 2002/0105678 A1* | 8/2002 | Shiraiwa | ............... | H04N 1/00 358/1.15 |
| 2008/0114903 A1* | 5/2008 | Tadokoro | ............... | G06F 21/33 710/8 |
| 2008/0316337 A1* | 12/2008 | Fukuzawa | ............ | G06K 15/002 348/231.99 |
| 2012/0320415 A1* | 12/2012 | Nakamura | ............. | G06K 15/02 358/1.15 |

FOREIGN PATENT DOCUMENTS

| | | |
|---|---|---|
| CN | 102984416 A | 3/2013 |
| CN | 103916568 A | 7/2014 |
| JP | H08-023548 A | 1/1996 |

* cited by examiner

*Primary Examiner* — Brandon S Hoffman
*Assistant Examiner* — Samuel Ambaye
(74) *Attorney, Agent, or Firm* — Canon U.S.A., Inc. IP Division

(57) ABSTRACT

A communication apparatus includes a holding unit, an updating unit, an authentication unit, a mode controller, and a mode acquisition unit. The holding unit holds configuration information used to control the communication apparatus. The updating unit updates the configuration information held in the holding unit with occasional configuration information. The authentication unit performs user authentication in communication with the external apparatus. The mode controller controls the mode of the communication apparatus. The mode acquisition unit acquires the mode of the communication apparatus controlled by the mode controller. The configuration information includes an account configuration used for the authentication unit. Depending on (Continued)

a result of acquisition performed by the mode acquisition unit, the updating unit does not update, with the occasional configuration information, at least part of the account configuration included in the configuration information held in the holding unit.

13 Claims, 6 Drawing Sheets

COMMUNICATION APPARATUS

BACKGROUND OF THE INVENTION

Field of the Invention

The present invention relates to a communication apparatus and a communication apparatus including a restoration unit that performs restoration by using information including, for example, saved configuration information.

Description of the Related Art

When communication apparatuses are operated, configuration information such as that of user accounts and that of a network configuration that are used for communication is saved. The saved configuration information is appropriately used at the time of a failure or the like of a communication apparatus, and the configuration information in the communication apparatus is restored. For example, Japanese Patent Laid-Open No. 8-23548 discloses an image pickup apparatus having a function of restoring configuration information to factory configured information.

Functions of saving and restoring configuration information of an image pickup apparatus that is an example of a communication apparatus have been widely known because open network video interface forum (ONVIF) standards have defined the functions as basic function commands.

However, the ONVIF standards have not specified the content of configuration information to be saved and restored, that is, the information to be included in the configuration information. Under such circumstances, restoration of a certain range of configuration information is undesirable in some cases such as cases where a password for an administrative user or other users has been forgotten when restoration of the configuration of an image pickup apparatus is performed and where the configuration mode of the image pickup apparatus has been transitioned due to the restoration.

In such cases, a user needs to verify the mode of the image pickup apparatus after the restoration. Further, in a case where the image pickup apparatus is in an unintended mode, the user needs to change the configuration information again to cause the image pickup apparatus to transition to an intended mode. Such events frustrate or inconvenience a user.

SUMMARY OF THE INVENTION

The present invention provides appropriate apparatus operation without forcing troublesome work upon a user at the time of saving or restoring configuration information.

The present invention features a communication apparatus including a communication unit, a holding unit, an updating unit, an authentication unit, a mode controller, and a mode acquisition unit. The communication unit performs communication with an external apparatus through a network, the communication being performed for exchanging data including at least an image. The holding unit holds configuration information used to control the communication apparatus. The updating unit updates the configuration information held in the holding unit with occasional configuration information. The authentication unit performs user authentication in communication with the external apparatus. The mode controller controls the mode of the communication apparatus. The mode acquisition unit acquires the mode of the communication apparatus controlled by the mode controller. The configuration information includes an account configuration used for the authentication unit. Depending on a result of acquisition performed by the mode acquisition unit, the updating unit does not update, with the occasional configuration information, at least part of the account configuration included in the configuration information held in the holding unit.

Further features of the present invention will become apparent from the following description of exemplary embodiments with reference to the attached drawings.

DESCRIPTION OF THE EMBODIMENTS

Hereinafter, embodiments of the present invention will be described in detail with reference to the drawings.

Note that configurations described in the following embodiments are only examples, and the invention is not limited to the illustrated configurations. In addition, commands in the following embodiments are specified based on, for example, open network video interface forum (ONVIF) standards.

First Embodiment

Hereinafter, a network configuration according to a first embodiment will be described with reference to FIG. 1.

Figure 1:
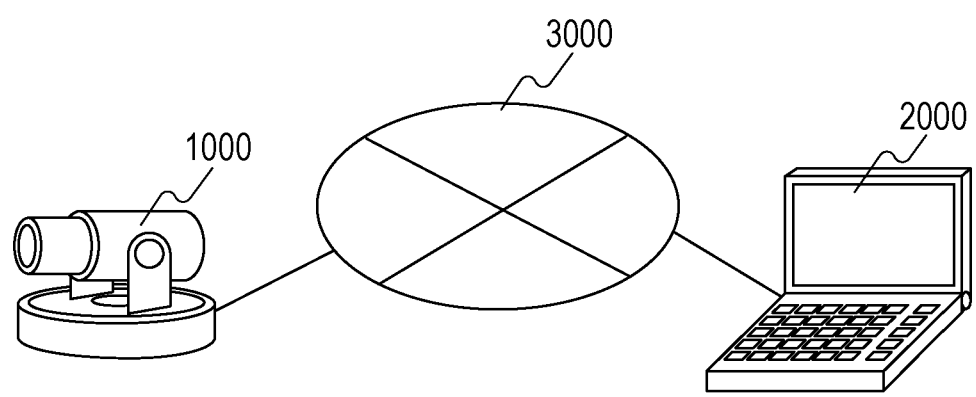
FIG. 1 is a network configuration diagram including an image pickup apparatus according to a first embodiment of the present invention.

FIG. 1 is a system configuration diagram including an image pickup apparatus 1000. Reference numeral 2000 denotes a client apparatus representing an external apparatus in the present invention. The image pickup apparatus 1000 and the client apparatus 2000 are connected to each other through a network 3000 to enable mutual communications. The client apparatus 2000 transmits various control commands to the image pickup apparatus 1000. Examples of the control commands include commands for performing backup (saving) of configuration information, restoration of configuration information performed using a designated backup file for the configuration information, generation, change, and deletion of a user account, camera control, and the like. The image pickup apparatus 1000 having received a control command transmits a response to the client apparatus 2000 in response to the control command.

Note that the image pickup apparatus 1000 in the embodiment is an example of a communication apparatus that communicates with the client apparatus 2000 through a network and is, for example, a monitoring camera that picks up a moving image. More specifically, the image pickup apparatus 1000 is a network camera used for monitoring. The client apparatus 2000 in the embodiment is an example of an external apparatus such as a personal computer (PC). A monitoring system including the image pickup apparatus 1000 and the external apparatus 2000 in the embodiment corresponds to an image pickup system.

The network 3000 includes, for example, a plurality of routers, switches, cables that comply with a communication standard such as Ethernet (registered trademark). However, in the embodiment, as long as a network enables communications between the image pickup apparatus 1000 and the client apparatus 2000, the network may be used regardless of the communication standard, scale, and configuration.

For example, the network 3000 may be configured using the Internet, a wired local area network (LAN), a wireless LAN, a wide area network (WAN), and other networks. The image pickup apparatus 1000 in the embodiment may support, for example, power over ethernet (PoE) (registered trademark) or may be supplied with electric power through a LAN cable.

Figure 2A:
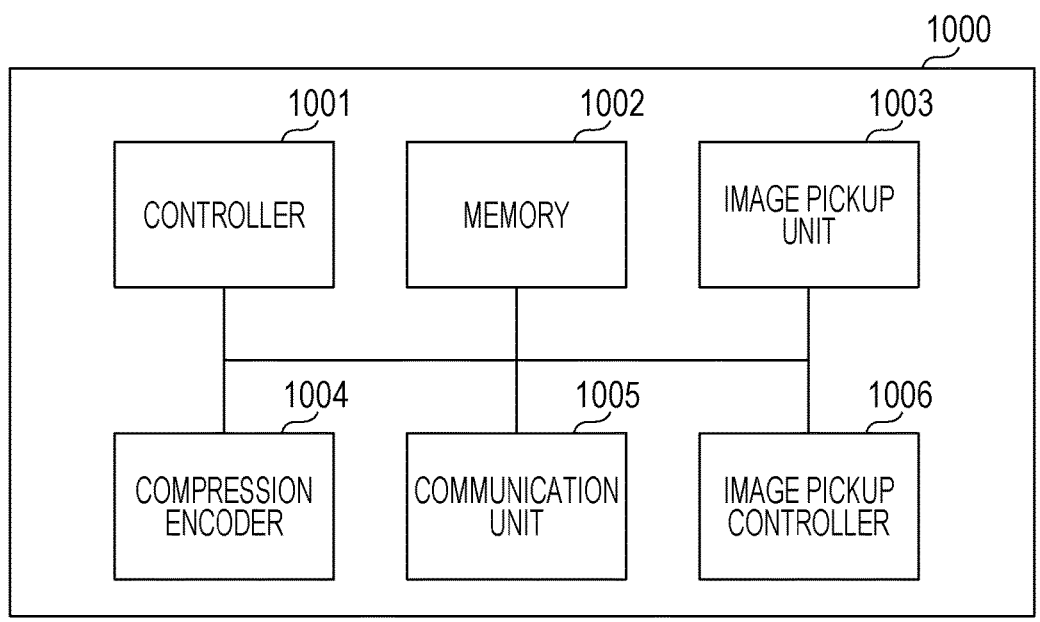
FIGS. 2A and 2B are functional block and system configuration diagrams of the image pickup apparatus and a client apparatus, respectively, according to the first embodiment of the present invention.

FIG. 2A is a diagram illustrating the internal configuration of the image pickup apparatus 1000.

In FIG. 2A, reference numeral 1001 denotes a controller, and the controller 1001 performs overall control of the image pickup apparatus 1000. The controller 1001 includes, for example, a central processing unit (CPU).

Reference numeral 1002 denotes a memory. The memory 1002 is used as storage areas for various pieces of data such as a storage area for programs mainly run by the controller 1001, a work area used during a runtime of a program, a storage area for configuration information such as a user account configuration, and a storage area for image data generated by an image pickup unit 1003 (described later). The memory 1002 also holds default configuration information configured at the time of factory shipment of the image pickup apparatus 1000.

Reference numeral 1003 denotes the image pickup unit. The image pickup unit 1003 converts an analog signal obtained by picking up a subject image formed by the imaging optical system of the image pickup apparatus 1000 into digital data and outputs the digital data as a picked-up image to the memory 1002. When the picked-up image is output to the memory 1002, the controller 1001 receives an image acquisition event from the image pickup unit 1003.

Reference numeral 1004 denotes a compression encoder. The compression encoder 1004 generates image data by performing a compression encoding process on the picked-up image output by the image pickup unit 1003 on the basis of the format of JPEG, H.264, or the like and outputs the image data to the memory 1002.

Reference numeral 1005 denotes a communication unit. The communication unit 1005 is used in cases where a control command is received from the external apparatus and where a response is transmitted to the external apparatus in response to the control command. In a case where a command is received from the external apparatus, the controller 1001 receives a command reception event from the communication unit 1005.

Reference numeral 1006 denotes an image pickup controller. The image pickup controller 1006 is used to change the image pickup range of the image pickup unit 1003 to an image pickup range driven for tilting, panning, or zooming on the basis of a value for tilting, panning, or zooming input by the controller 1001.

Figure 2B:
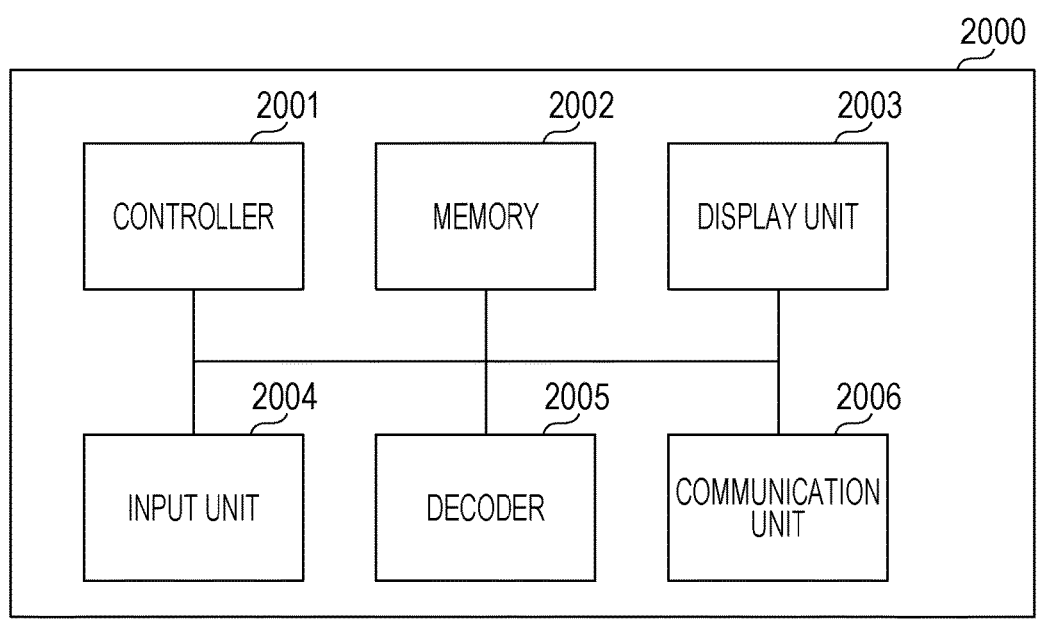

FIG. 2B is a diagram illustrating the internal configuration of the client apparatus 2000.

In FIG. 2B, reference numeral 2001 denotes a controller. The controller 2001 includes, for example, a CPU and performs overall control of the client apparatus 2000.

Reference numeral 2002 denotes a memory. The memory 2002 is used as storage areas for various pieces of data such as a storage area for programs mainly run by the controller 2001 and a work area used during a runtime of a program.

Reference numeral 2003 denotes a display unit. The display unit 2003 includes, for example, a liquid crystal display, an organic electroluminescent display, or the like and displays various configuration screens including a delivered-image configuration screen (described later), a viewer for video received from the image pickup apparatus 1000, various messages, and the like to a user of the client apparatus 2000.

Reference numeral 2004 denotes an input unit. The input unit 2004 includes, for example, buttons, a directional pad, a touch panel, a mouse, and other components and notifies the controller 2001 of the content of a screen operation performed by the user.

Reference numeral 2005 denotes a decoder. The decoder 2005 decodes compression-encoded image data received through a communication unit 2006 on the basis of the format of JPEG, H.264, or the like and loads the decoded image data into the memory 2002.

Reference numeral 2006 denotes a communication unit. The communication unit 2006 transmits, to the image pickup apparatus 1000, control commands including commands for restoration of configuration information performed using a designated backup file and for a user account configuration. The communication unit 2006 is also used in a case where a response to a control command or a video stream is received from the image pickup apparatus 1000.

The internal configurations of the image pickup apparatus 1000 and the client apparatus 2000 have heretofore been described with reference to FIGS. 2A and 2B. The processing blocks illustrated in FIGS. 2A and 2B are used to explain examples of embodiments of an image pickup apparatus and a client apparatus in the present invention, and the embodiments are not limited thereto. Various modifications and alterations such as provision of an audio input unit, an audio output unit, or an image analysis processer may be made without departing from the scope of the spirit of the present invention.

Figure 3:
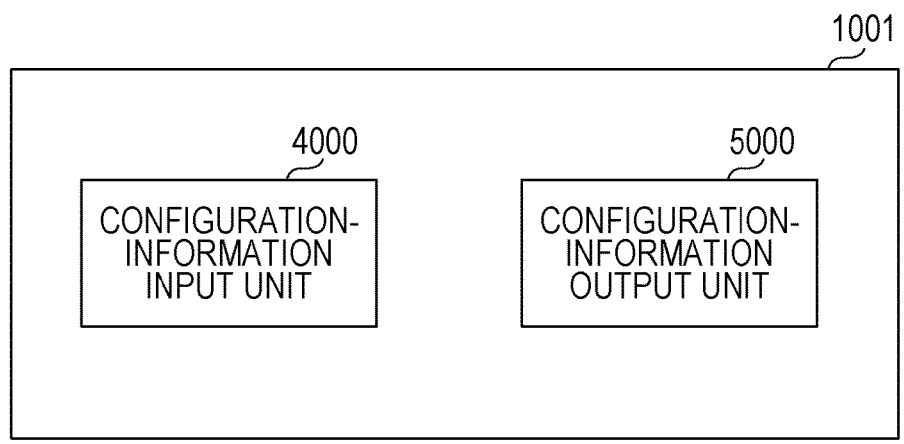
FIG. 3 is a system configuration diagram of backup and restoration functions for configuration information of the image pickup apparatus according to the first embodiment of the present invention.

FIG. 3 is a diagram illustrating the internal configuration of functions of backing up and restoring configuration information in the controller 1001.

Reference numeral 4000 denotes a configuration-information input unit. When the communication unit 1005 receives, from the client apparatus 2000, a request command for restoration using a backup file designated for configuration information, the configuration-information input unit 4000 acquires the backup file through the communication unit 1005. In the embodiment, the backup file that is occasional configuration information is stored in a server (not illustrated) or other apparatuses on the network 3000. The client apparatus 2000 designates the backup file through the user's operation of the input unit 2004 or other units.

The configuration-information input unit 4000 extracts the configuration information from the backup file and selects a piece of configuration information to be actually used for the restoration from the extracted configuration information. The configuration-information input unit 4000 subsequently updates the configuration-information storage area of the memory 1002.

Reference numeral 5000 denotes a configuration-information output unit. When the communication unit 1005 receives a request command for acquiring a backup file from the client apparatus 2000, the configuration-information output unit 5000 acquires configuration information from the configuration-information storage area of the memory 1002. The configuration-information output unit 5000 subsequently converts the configuration information into a backup file, and the communication unit 1005 transmits the backup file to the client apparatus 2000, the server (not illustrated), or other apparatuses on the network 3000.

Note that the backup file is held outside the image pickup apparatus 1000 in the embodiment, but the embodiment is not limited thereto. For example, the image pickup apparatus 1000 may include a memory dedicated for backup files, and the backup files may be held in the memory.

Commands and transactions will next be described with reference to FIG. 6.

Figure 6:
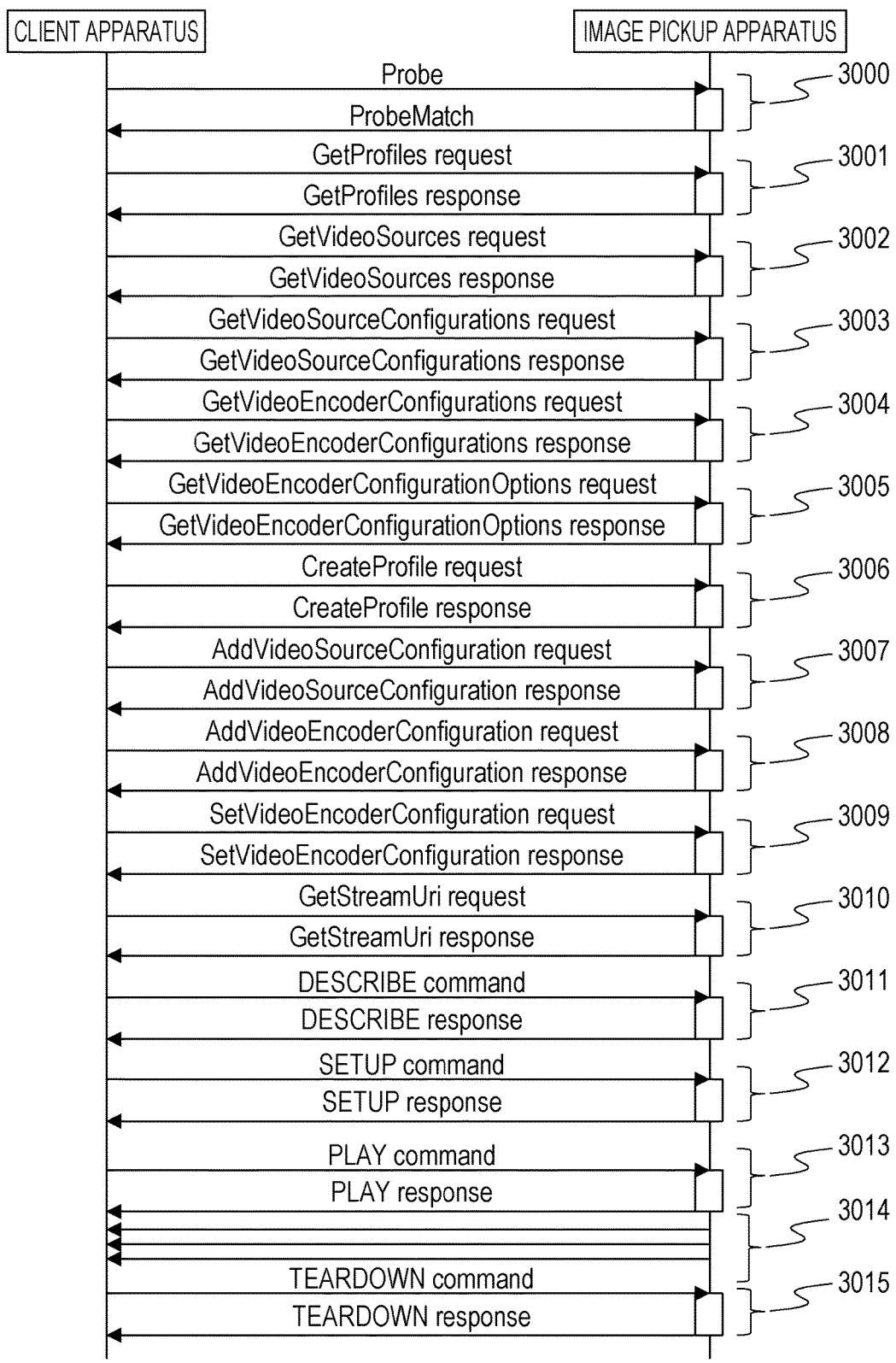
FIG. 6 is an example of a command sequence diagram.

FIG. 6 illustrates a typical command sequence from the configuration start to video streaming, the sequence being performed between the image pickup apparatus 1000 and the client apparatus 2000. The term "transaction" denotes a pair of a command transmitted from the client apparatus 2000 to the image pickup apparatus 1000 and a response transmitted from the image pickup apparatus 1000 to the client apparatus 2000 in response to the command.

Reference numeral 3000 denotes a transaction for searching an apparatus. The client apparatus 2000 transmits a search request with a predetermined condition to the server or other apparatuses on the network 3000. An image pickup apparatus 1000 that satisfies the condition included in the search request transmits a search response to the client apparatus 2000.

Reference numeral 3001 denotes a transaction for acquiring a delivery profile. The client apparatus 2000 identifies a deliverable delivery profile configuration that is present in the image pickup apparatus 1000 on the basis of a delivery profile ID and acquires a list of currently available delivery profiles together with delivery profile IDs.

Reference numeral 3002 denotes a transaction for acquiring a function of an image processor. In the transaction, the client apparatus 2000 acquires image-processing-function configuration information held by the image pickup apparatus 1000.

Reference numeral 3003 denotes a transaction for acquiring an image processing configuration list. In the transaction, the client apparatus 2000 acquires the list including image processing configuration IDs held by the image pickup apparatus 1000 from the image pickup apparatus 1000.

Reference numeral 3004 denotes a transaction for acquiring a function of a compression encoder. In the transaction, the client apparatus 2000 acquires information regarding the function provided by the compression encoder 1004 of the image pickup apparatus 1000.

Reference numeral 3005 denotes a transaction for acquiring a compression encoding configuration list. In the transaction, the client apparatus 2000 acquires the list including compression encoding configuration IDs stored in the memory 1002 from the image pickup apparatus 1000.

Reference numeral 3006 denotes a transaction for requesting delivery profile creation. In the transaction, the client apparatus 2000 creates a delivery profile in the image pickup apparatus 1000 and acquires the ID of the delivery profile. The image pickup apparatus 1000 stores therein the created delivery profile.

Reference numeral 3007 denotes a transaction for requesting addition of image processing configuration. In the transaction, the client apparatus 2000 designates the delivery profile ID acquired in the transaction 3006 and one of the image processing configuration IDs acquired in the transaction 3003. The image pickup apparatus 1000 stores therein the designated delivery profile and the designated image processing configuration in association with each other.

Reference numeral 3008 denotes a transaction for requesting addition of a compression encoding configuration. In the transaction, the client apparatus 2000 designates the delivery profile ID acquired in the transaction 3006 and a compression encoding configuration ID acquired in the transaction 3004 and associates the delivery profile with the compression encoding configuration. The image pickup apparatus 1000 stores therein the designated delivery profile and the compression encoding configuration in association with each other.

Reference numeral 3009 denotes a transaction for changing the compression encoding configuration. In the transaction, the client apparatus 2000 changes the content of the compression encoding configuration acquired in the transaction 3004 on the basis of the options acquired in the transaction 3005. For example, the client apparatus 2000 changes a compression encoding method or a cutout size. The image pickup apparatus 1000 stores therein the content of the changed compression encoding configuration.

Reference numeral 3010 denotes a transaction for requesting acquisition of a delivery address. In the transaction, the client apparatus 2000 designates the delivery profile ID acquired in the transaction 3006 and acquires a delivery address for acquiring video to be delivered based on the configuration of the designated delivery profile. The image pickup apparatus 1000 returns, to the client apparatus 2000, the delivery address for delivering an image corresponding to the content of the image processing configuration and the compression encoding configuration that are associated with the designated delivery profile ID.

Reference numeral 3011 denotes a transaction for requesting acquisition of delivery information. In the transaction, the client apparatus 2000 designates the delivery address acquired in the transaction 3010 and acquires detail data regarding the delivery information of the image pickup apparatus 1000.

Reference numeral 3012 denotes a transaction for requesting a delivery configuration. In the transaction, the client apparatus 2000 causes the image pickup apparatus 1000 to prepare for streaming on the basis of the detail data regarding the delivery information acquired in the transaction 3011. Execution of the command causes the client apparatus 2000 and the image pickup apparatus 1000 to share a stream transmission method including a session number.

Reference numeral 3013 denotes a transaction for starting delivery. By using the session number acquired in the transaction 3012, the client apparatus 2000 causes the image pickup apparatus 1000 to start an image stream based on the configuration of the designated delivery profile.

Reference numeral 3014 denotes a stream to be delivered from the image pickup apparatus 1000 to the client apparatus 2000. The stream requested in the transaction 3013 to be started is delivered by the transmission method shared in the transaction 3012.

Reference numeral 3015 denotes a transaction for stopping the delivery. In the transaction, the client apparatus 2000 designates the session number acquired in the transaction 3012 and stops the stream in the course of the delivery.

Figure 7:
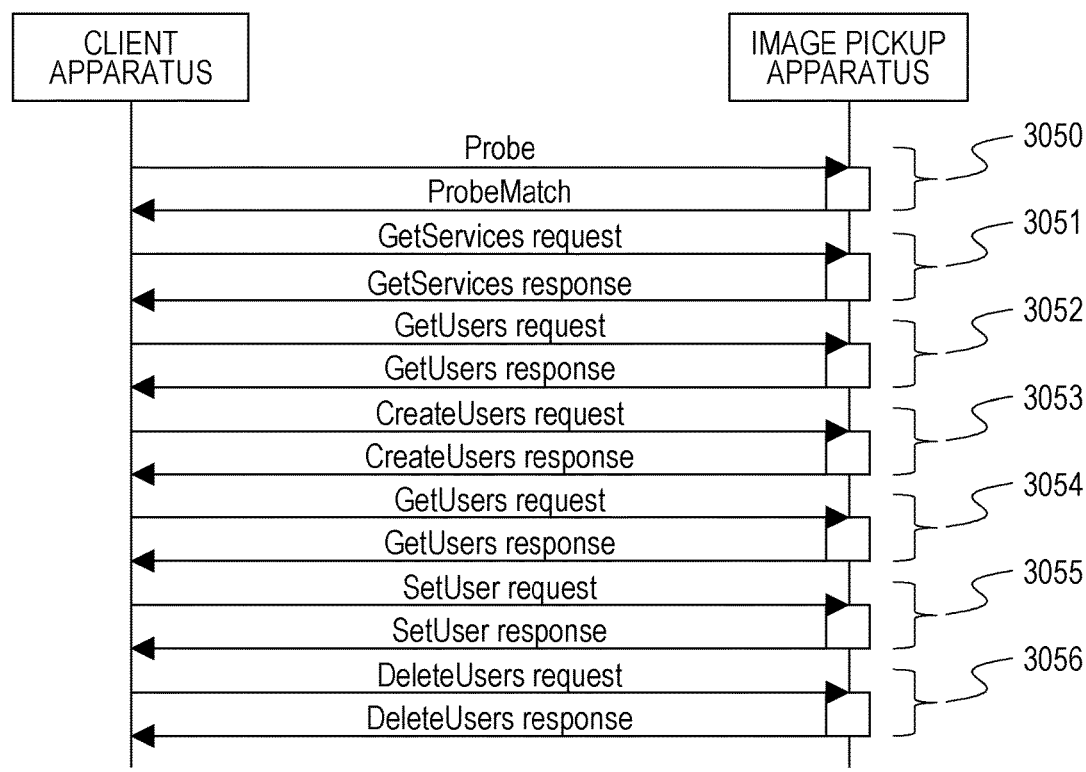
FIG. 7 is an example of a command sequence diagram.

FIG. 7 illustrates a typical command sequence in user creation, configuration, and deletion processes, the sequence being performed between the image pickup apparatus 1000 and the client apparatus 2000.

Reference numeral 3050 denotes a transaction for searching for an apparatus. The client apparatus 2000 transmits a search request with a predetermined condition to the server or other apparatuses on the network 3000. An image pickup apparatus 1000 that satisfies the condition included in the search request transmits a search response to the client apparatus 2000.

Reference numeral 3051 denotes a transaction for requesting acquisition of a function. In the transaction, the client apparatus 2000 acquires a list of functions of the image pickup apparatus 1000. The client apparatus 2000 verifies whether the functions support user creation, configuration, and deletion processes.

Reference numeral 3052 denotes a transaction for requesting acquisition of a list of users. In the transaction, the client apparatus 2000 acquires the user list held by the image pickup apparatus 1000.

Reference numeral 3053 denotes a transaction for requesting creation of a user. In the transaction, the client apparatus 2000 requests creation of a desired user, and the image pickup apparatus 1000 creates the requested user and sets the user in a memory 1008.

Reference numeral 3054 denotes a transaction for requesting acquisition of the user list. In the transaction, the client apparatus 2000 acquires the user list that is held by the image pickup apparatus 1000 and that includes the user created in the transaction 3053.

Reference numeral 3055 denotes a transaction for requesting change of a user configuration. In the transaction, the client apparatus 2000 causes change of the configuration of a desired user in the user list held by the image pickup apparatus 1000.

Reference numeral 3056 denotes a transaction for requesting deletion of a user. In the transaction, the client apparatus 2000 causes deletion of a user from the image pickup apparatus 1000, the user being included in the user list acquired in the transaction 3052 or 3054 or the user created in the transaction 3053. The image pickup apparatus 1000 deletes the information regarding the designated user.

The image pickup apparatus 1000 in the embodiment can also set the authorization level of a user who operates the client apparatus 2000 and transmits a control command and the like through the command sequence in FIG. 7. The image pickup apparatus 1000 can restrict executable control in accordance with the authorization level. The image pickup apparatus 1000 in the embodiment can also set an administrative user. The administrative user is a user who is authorized to perform overall management of the image pickup apparatus 1000 and who is assigned an authorization level in which any control command is executable. The image pickup apparatus 1000 in the embodiment stores, in the memory 1008, user account configurations in which an ID of each user, the authorization level, a password, and the like are associated with each other. The image pickup apparatus 1000 authenticates a user on the basis of a result of input performed through the input unit 2004 or the like of the client apparatus 2000 and assigns the user one of the authorization levels stored in the memory 1008. The operation of authenticating a user may also be performed by the client apparatus 2000 in the same manner. In addition, the image pickup apparatus 1000 may use the result of user authentication performed by the client apparatus 2000.

Figure 4:
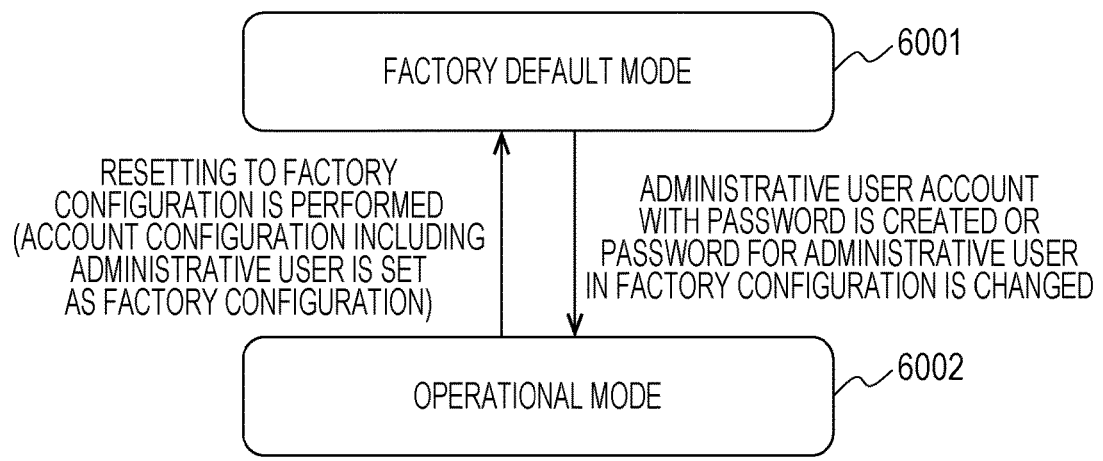
FIG. 4 is a diagram illustrating mode transition between a factory default mode and an operational mode of the image pickup apparatus according to the first embodiment of the present invention.

FIG. 4 is a diagram illustrating the modes of the image pickup apparatus 1000 and mode transition therebetween. The image pickup apparatus 1000 in the embodiment is in one of two types of modes that are a FactoryDefaultMode 6001 and an OperationalMode 6002. In the embodiment, the controller 1001 corresponds to a mode controller that controls the mode of the image pickup apparatus 1000.

The FactoryDefaultMode 6001 represents a mode in which setting up an image pickup apparatus has not been completed. In this mode, the image pickup apparatus 1000 in the embodiment can perform any control without user authentication. For example, in a case where the image pickup apparatus 1000 is switched on the first time after factory shipment or is switched on after the image pickup apparatus 1000 is switched off in the FactoryDefaultMode 6001, the image pickup apparatus 1000 is started in the FactoryDefaultMode 6001.

The image pickup apparatus 1000 in the embodiment transitions to the OperationalMode 6002 when the transaction for creating a user illustrated in FIG. 7 is performed. Specifically, the transition to the OperationalMode 6002 is triggered by creation of an administrative user performed in the FactoryDefaultMode 6001, change of a password for an administrative user set in the factory configuration, and the like.

The OperationalMode 6002 represents a mode in which image pickup apparatus operation has been started. In this mode, user authentication to perform control is required in the image pickup apparatus 1000 in the embodiment. In addition, in a case where an operation of changing the mode to the FactoryDefaultMode 6001 such as a reset to the factory configuration is performed in the OperationalMode 6002, the user account configuration including the administrative user is set as the factory configuration, and the image pickup apparatus 1000 transitions to the FactoryDefaultMode 6001.

To set up an apparatus in the FactoryDefaultMode 6001, restoration to the configuration in a saved backup file is generally conceivable. However, in a case where the backup file includes a user account configuration including an administrative user, the FactoryDefaultMode 6001 might transition to the OperationalMode 6002 involving no explicit operation such as creation of an administrator or change of a password. As a result, a user of the image pickup apparatus needs to verify the mode of the image pickup apparatus after the restoration. Further, in a case where the image pickup apparatus is in an unintended mode, the user needs to change the configuration information again to cause the image pickup apparatus to transition to an intended mode. Such events frustrate or inconvenience a user.

Note that another mode may be provided in addition to the two modes in the embodiment. In this case, in accordance with the transition mode, functions may be restricted, and user authentication may be requested to the user.

Figure 5:
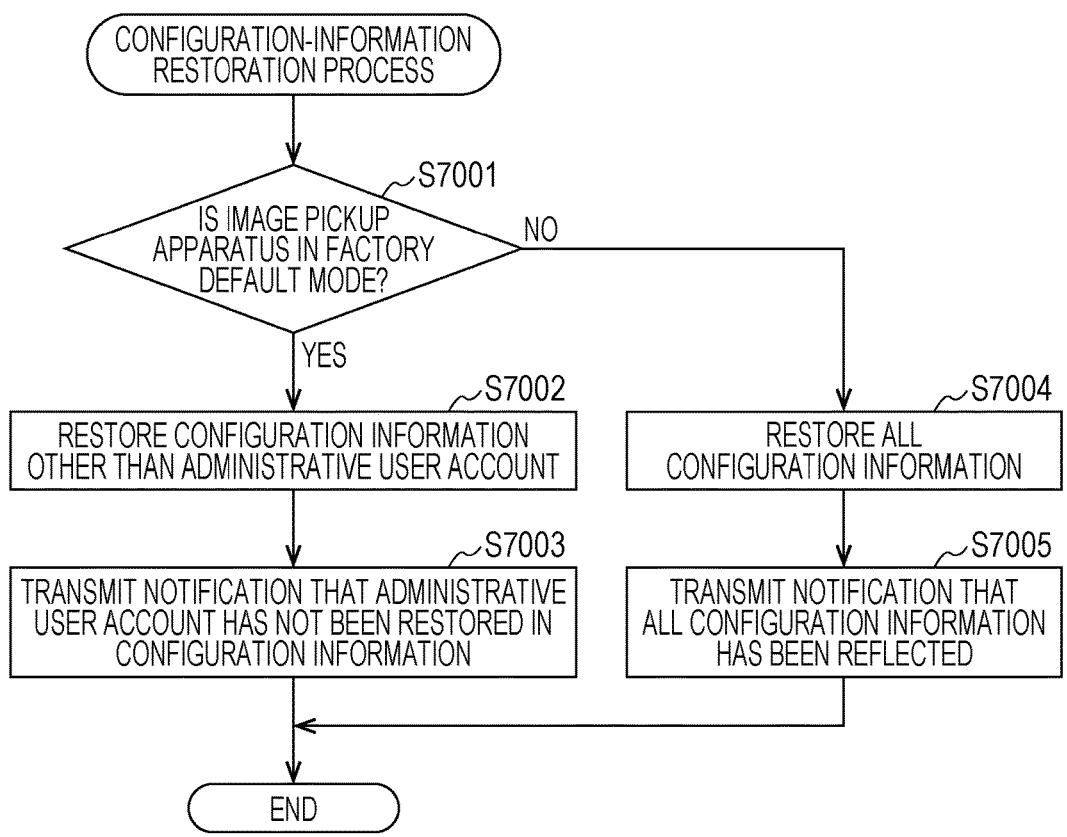
FIG. 5 is a flowchart illustrating a configuration-information restoration process performed in a case where a designated backup file includes an administrative user account configuration when the configuration information of the image pickup apparatus according to the first embodiment of the present invention is restored, the administrative user account configuration causing mode transition of the image pickup apparatus.

A configuration-information restoration process after restoration performed by the configuration-information input unit 4000 of the image pickup apparatus 1000 according to the embodiment will be described with reference to a flowchart in FIG. 5. The process in the flowchart is performed by the controller 1001.

First, in step S7001, the controller 1001 acquires the current mode of the image pickup apparatus 1000 from the configuration-information storage area of the memory 1002. If the image pickup apparatus 1000 is in the FactoryDefaultMode 6001 according to the acquisition result, the process proceeds to step S7002. If the image pickup apparatus 1000 is not in the FactoryDefaultMode 6001, the process proceeds to step S7004. In the embodiment, the controller 1001 corresponds to a mode acquisition unit that acquires the mode of the image pickup apparatus 1000.

In step S7002, the controller 1001 acquires a backup file designated by the client apparatus 2000, through the communication unit 1005 by using the configuration-information input unit 4000, extracts configuration information from the backup file, and updates the configuration information in the memory 1002 with the content of the extracted configuration information. At this time, the controller 1001 restores the configuration information other than an administrative user account configuration in the configuration-information storage area of the memory 1002 to prevent automatic transition to the OperationalMode 6002 after the restoration. The process subsequently proceeds to step S7003.

In step S7003, the controller 1001 notifies the client apparatus 2000 through the communication unit 1005 that the configuration information other than the administrative user account configuration has been restored to that in the backup file. The process is then terminated.

In contrast in step S7004, the controller 1001 acquires the backup file designated by the client apparatus 2000, through the communication unit 1005 by using the configuration-information input unit 4000. The controller 1001 extracts the configuration information from the backup file, and restores all configuration information in the configuration-information storage area of the memory 1002 to the extracted configuration information. The process subsequently proceeds to step S7005.

In step S7005, the controller 1001 notifies the client apparatus 2000 through the communication unit 1005 that all configuration information has been restored to that included in the backup file. The process is then terminated.

In the first embodiment as described above, when the image pickup apparatus 1000 is in the FactoryDefaultMode 6001, the configuration information other than the administrative user account configuration is restored to prevent the transition to the OperationalMode 6002 involving no explicit user operation after the restoration.

In the embodiment, the example in which an operation of restoring the configuration information other than the administrative user account configuration is performed at the time of restoration has been described, but the embodiment is not limited thereto. For example, when a backup file is generated, switching may be performed between backing up and not backing up the configuration information of the administrative user account configuration, in accordance with the mode of the image pickup apparatus 1000.

In addition, the mode of the image pickup apparatus 1000 may include a restored mode. If restoration is performed when the image pickup apparatus 1000 is in the restored mode, the configuration information including the administrative user account configuration is restored. For example, in a case where a restoration operation is performed due to a failure of the image pickup apparatus 1000, restoration can thereby be easily performed by using the backed up configuration information. Note that in such a case where the manufacturer of the image pickup apparatus 1000 repairs and then delivers the image pickup apparatus 1000, it is desirable that the image pickup apparatus 1000 be in the restored mode.

In the description of the embodiment, a switching operation is performed between restoring and not restoring the administrative user account configuration when restoration of the configuration information is performed, in accordance with the mode of the image pickup apparatus 1000. However, the embodiment is not limited thereto. For example, the image pickup apparatus 1000 may transmit a response to the client apparatus 2000 as appropriate. Specifically, in step S7002, the image pickup apparatus 1000 may transmit a response indicating that displaying an inquiry of whether to restore the administrative user account configuration on the display unit 2003 of the client apparatus 2000 is selectable.

In the embodiment, a switching operation is performed between restoring and not restoring the account configuration in accordance with the mode of the image pickup apparatus 1000. However, a switching operation may be performed between restoring and not restoring configuration information other than the account configuration in accordance with the mode of the image pickup apparatus 1000. For example, a switching operation may be performed between restoring and not restoring a network configuration including the IP address, the subnet, the default gateway, and the domain name system server that are configured for the image pickup apparatus 1000. In this case, configuration information to be backed up may include not only the mode of the image pickup apparatus 1000 but also identification information identifying an apparatus such as the serial number, the manufacturing number, the media access control address, and the like. Specifically, in a case where the serial number and the like are used to back up configuration information for an apparatus and where restoration is thereafter performed on the apparatus, the network configuration is also restored. When the restoration is performed, this operation can avoid disconnection from the network due to double network configurations or a change of an address that has been available for connection.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-017712, filed Jan. 30, 2015, which is hereby incorporated by reference herein in its entirety.

What is claimed is:

1. An image pickup apparatus comprising:
a hardware processor; and
a memory for storing instructions to be executed by the hardware processor, wherein, when the instructions stored in the memory are executed by the hardware processor, the image pickup apparatus functions as:
a communication unit that performs communication with an external apparatus through a network;
a user authentication unit that performs user authentication in the communication with the external apparatus;
a holding unit that holds configuration information including an account configuration to be used for the user authentication unit;
an updating unit that updates the configuration information held in the holding unit based on a backup file including the account configuration for an administrative user, in response to a control command from the external apparatus; and
a mode control unit that performs control of transition of a state of the image pickup apparatus between a factory default state and an operational state,
wherein the factory default state is a state where controlling the image pickup apparatus by the external apparatus is not restricted based on a result of the user authentication,
wherein the operational state is a state where controlling the image pickup apparatus by the external apparatus is restricted based on the result of the user authentication,
wherein the operational state is a state which is changed from the factory default state by the mode control unit after the holding unit held the account configuration for the administrative user in accordance with operation by a user,
wherein, in a case where the image pickup apparatus is in the factory default state, the updating unit does not update, based on the backup file, the account configuration for the administrative user included in the configuration information held in the holding unit, in response to the control command from the external apparatus, and
wherein, in a case where the image pickup apparatus is in the operational state, the updating unit updates, based on the backup file, the account configuration for the administrative user included in the configuration information held in the holding unit, in response to the control command from the external apparatus.

2. The image pickup apparatus according to claim 1, wherein, when the instructions stored in the memory are executed by the hardware processor, the image pickup apparatus further functions as:
a restriction unit that imposes a restriction on a usable function on the basis of the result of the user authentication performed by the authentication unit.

3. The image pickup apparatus according to claim 2, wherein in a case where the mode controller has caused the transition to the operational state, the restriction unit imposes the restriction on the function on the basis of the result of the user authentication performed by the authentication unit, and in a case where the mode controller has caused the transition to the factory default state, the restriction unit eases the restriction on the function.

4. The image pickup apparatus according to claim 1, wherein, when the instructions stored in the memory are executed by the hardware processor, the image pickup apparatus further functions as:

a configuration information output unit that outputs at least part of the configuration information held in the holding unit; and
a designation unit that designates information used by the updating unit to update the configuration information held in the holding unit.

5. The image pickup apparatus according to claim 1, further comprising:
a receiver that receives the control command from the external apparatus through the network; and
a transmitter that transmits a response to the control command received by the receiver through the network,
wherein the transmitter transmits a response including an indication of whether the updating unit has updated the at least part of the account configuration.

6. The image pickup apparatus according to claim 1, wherein, when the instructions stored in the memory are executed by the hardware processor, the image pickup apparatus further functions as:
an initialization unit that initializes the configuration information,
wherein in a case where the initialization unit initializes the configuration information, the mode controller performs control causing the transition to the factory default state.

7. The image pickup apparatus according to claim 1, wherein, when the instructions stored in the memory are executed by the hardware processor, the image pickup apparatus further functions as:
a configuration unit that configures the configuration information,
wherein in a case where the configuration unit configures the account configuration for the administrative user, the mode controller performs control causing the transition to the operational state.

8. The image pickup apparatus according to claim 1, wherein the configuration information held in the holding unit includes a network configuration for connection to the network and identification information for identifying the image pickup apparatus, and
wherein the updating unit does not update, with configuration information that is occasional configuration information, the network configuration included in the configuration information held in the holding unit.

9. The image pickup apparatus according to claim 1, wherein the configuration information includes configuration information used for controlling the image pickup apparatus.

10. The image pickup apparatus according to claim 1, wherein, when the instructions stored in the memory are executed by the hardware processor, the image pickup apparatus further functions as:
an image pickup unit that picks up an image including a subject; and
a generation unit that generates image data from the image picked up by the image pickup unit,
wherein data exchanged in the communication with the external apparatus through the network includes the image data generated by the generation unit.

11. The image pickup apparatus according to claim 1, wherein, when the instructions stored in the memory are executed by the hardware processor, the image pickup apparatus further functions as:
a backup unit that backs up the configuration information held in the holding unit, wherein the updating unit updates the configuration information held in the holding unit by using the configuration information backed up by the backup unit.

12. A method of an image pickup apparatus, the method comprising:
performing communication with an external apparatus through a network;
performing user authentication in the communication with the external apparatus;
holding configuration information including an account configuration to be used for the user authentication;
updating the configuration information based on a backup file including the account configuration for an administrative user, in response to a control command from the external apparatus; and
performing control of transition of a state of the image pickup apparatus between a factory default state and an operational state,
wherein the factory default state is a state where controlling the image pickup apparatus by the external apparatus is not restricted based on a result of the user authentication,
wherein the operational state is a state where controlling the image pickup apparatus by the external apparatus is restricted based on the result of the user authentication,
wherein the operational state is a state which is changed from the factory default state by the control of transition after the holding held the account configuration for the administrative user in accordance with operation by a user,
wherein, in a case where the image pickup apparatus is in the factory default state, the updating does not update, based on the backup file, the account configuration for the administrative user included in the configuration information, in response to the control command from the external apparatus, and
wherein, in a case where the image pickup apparatus is in the operational state, the updating updates, based on the backup file, the account configuration for the administrative user included in the configuration information, in response to the control command from the external apparatus.

13. A non-transitory computer-readable storage medium storing a program of instructions executable by a computer of an image pickup apparatus to perform a method of the image pickup apparatus, the method comprising:
performing communication with an external apparatus through a network;
performing user authentication in the communication with the external apparatus;
holding configuration information including an account configuration to be used for the user authentication;
updating the configuration information based on a backup file including the account configuration for an administrative user, in response to a control command from the external apparatus; and
performing control of transition of a state of the image pickup apparatus between a factory default state and an operational state,
wherein the factory default state is a state where controlling the image pickup apparatus by the external apparatus is not restricted based on a result of the user authentication,
wherein the operational state is a state where controlling the image pickup apparatus by the external apparatus is restricted based on the result of the user authentication,
wherein the operational state is a state which is changed from the factory default state by the control of transition after the holding held the account configuration for the administrative user in accordance with operation by a user,
wherein, in a case where the image pickup apparatus is in the factory default state, the updating does not update, based on the backup file, the account configuration for the administrative user included in the configuration information, in response to the control command from the external apparatus, and
wherein, in a case where the image pickup apparatus is in the operational state, the updating updates, based on the backup file, the account configuration for the administrative user included in the configuration information, in response to the control command from the external apparatus.

* * * * *